US006260063B1

(12) United States Patent
Ludtke et al.

(10) Patent No.: US 6,260,063 B1
(45) Date of Patent: *Jul. 10, 2001

(54) METHOD AND APPARATUS FOR REPRESENTING DEVICES AND AVAILABLE INFORMATION WITHIN A NETWORK OF DEVICES USING OBJECT LISTS AND OBJECT ENTRIES

(75) Inventors: Aaron Ludtke, San Jose, CA (US); Harumi Kawamura, Tokyo (JP)

(73) Assignees: Sony Coporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,540

(22) Filed: Mar. 17, 1998

(51) Int. Cl.[7] .................................................. G06F 15/173
(52) U.S. Cl. ............................ 709/224; 709/223; 345/356
(58) Field of Search ................................... 709/224, 227; 707/103, 104, 509; 710/17, 18, 19; 719/39, 97, 51; 345/433, 356

(56) References Cited

U.S. PATENT DOCUMENTS

| 5,261,044 | 11/1993 | Dev et al. ............................. 395/159 |
| 5,499,018 | 3/1996 | Welmer ............................ 340/825.07 |
| 5,546,540 | 8/1996 | White ................................. 395/200.1 |

(List continued on next page.)

OTHER PUBLICATIONS

Michael Teener, "A Bus on a Diet–The Serial Bus Alternative, An Introduction to the P1394 High Performance Serial Bus," Feb. 24, 1992, pp. 316–321, Santa Clara, California.

R.H.J. Bloks, "The IEEE–1394 High Speed Serial Bus," Jul. 1996, pp. 209–216, Phillips Journal of Research vol. 50.

"P1394 Standard For A High Performance Serial Bus," P1394 Draft 8.0v2, Jul. 7, 1995, IEEE, New York, New York.

* cited by examiner

Primary Examiner—Mehmet B. Geckil
(74) Attorney, Agent, or Firm—Haverstock & Owens LLP (57) ABSTRACT

Object lists and object entries provide a general hierarchical model for representing functions and capabilities of a network of devices in a uniform standardized format. The object lists and object entries are used to represent devices, subdevices, supported media, installed media and available services. Preferably, the devices are coupled together in an IEEE 1394-1995 serial bus network. The list of devices within the network are included within a unit object list, including unit object descriptors each representing a corresponding device. For devices having subunits, the unit object descriptor is associated with a subunit object list, including subunit object descriptors each representing a corresponding subunit within the device. Each subunit object descriptor then also has associated object lists, as appropriate, including a supported media object list including entries representing types of media supported by the subunit and an installed media object list including entries representing information available on the media currently installed within the subunit. For subunits capable of providing services, the subunit object descriptor has an associated object list, including an available services list including entries representing the services currently available through the subunit. The uniform standardized format of the object lists and object entries of the present invention allow two devices coupled together within the IEEE 1394-1995 serial bus network to exchange information including their respective object lists and entries.

20 Claims, 9 Drawing Sheets

U.S. PATENT DOCUMENTS

| | | | |
|---|---|---|---|
| 5,557,724 | 9/1996 | Sampat et al. | 395/157 |
| 5,568,605 | 10/1996 | Clouston et al. | 395/182.02 |
| 5,588,148 * | 12/1996 | Landis et al. | 707/1 |
| 5,634,010 | 5/1997 | Ciscon et al. | 395/200.15 |
| 5,650,775 | 7/1997 | Van Steenbrugge | 340/825.24 |
| 5,682,489 | 10/1997 | Harrow et al. | 395/349 |
| 5,692,211 | 11/1997 | Gulick et al. | 395/800 |
| 5,764,913 * | 6/1998 | Jancke et al. | 709/224 |
| 5,784,620 | 7/1998 | Isham | 395/683 |
| 5,802,291 | 9/1998 | Balick et al. | 395/200.32 |
| 5,809,331 * | 9/1998 | Staats et al. | 710/10 |
| 5,812,773 * | 9/1998 | Norin | 709/204 |
| 5,815,082 | 9/1998 | Welmer | 340/825.07 |
| 5,822,532 | 10/1998 | Ikeda | 395/200.54 |
| 5,825,775 | 10/1998 | Chin et al. | 370/401 |
| 5,875,446 * | 2/1999 | Brown et al. | 707/3 |
| 5,883,621 * | 3/1999 | Iwamura | 345/327 |
| 5,948,136 * | 9/1999 | Smyers | 710/108 |
| 5,958,012 * | 9/1999 | Battat et al. | 709/224 |
| 6,049,827 * | 4/2000 | Sugauchi et al. | 709/223 |

Fig. 1

| Object List Descriptor ||
|---|---|
| address | contents |
| 00 00₁₆ | descriptor_length |
| 00 01₁₆ | |
| 00 02₁₆ | object_list_type |
| 00 03₁₆ | |
| 00 04₁₆ | parent_object_list_number |
| 00 05₁₆ | |
| 00 06₁₆ | parent_object_entry_number |
| 00 07₁₆ | |
| 00 08₁₆ | number_of_objects (n) |
| 00 09₁₆ | |
| 00 0A₁₆ | object_entry[0] |
| ⋮ | |
| ⋮ | ⋮ |
| ⋮ | object_entry[n-1] |
| XX XX₁₆ | |

Fig. 2

| Object List Descriptor ||
|---|---|
| address offset | contents |
| 00₁₆ | entry_length |
| 01₁₆ | object_number |
| 02₁₆ | |
| 03₁₆ | attributes |
| 04₁₆ | number_of_object_lists (n) |
| 05₁₆ | |
| 06₁₆ | object_list_ID[0] |
| 07₁₆ | |
| ⋮ | ⋮ |
| ⋮ | object_list_ID[n-1] |
| ⋮ | |
| ⋮ | entry_specific_information |
| XX₁₆ | |

| address | contents |
|---|---|
| 00 00₁₆ | descriptor_length ((ww ww + 2)₁₆) |
| 00 01₁₆ | |
| 00 02₁₆ | parent_object_list_id |
| 00 03₁₆ | |
| 00 04₁₆ | parent_object_entry_id |
| 00 05₁₆ | |
| 00 06₁₆ | number_of_supported_media_types (n) |
| 00 07₁₆ | |
| 00 08₁₆ | supported_media_type[0] specification |
| : | ○ ○ ○ |
| ww ww₁₆ | supported_media_type[n] specification |

Fig. 5

| address offset | contents |
|---|---|
| 00₁₆ | specification_length ( ( type_dependent_length + 3) ) |
| 01₁₆ | medium_type |
| 02₁₆ | type_dependent_length |
| : | type_dependent_information |
| : | |
| 002₁₆ + type_dependent_length | |

Fig. 6

| address | contents |
|---|---|
| 00 00₁₆ | descriptor_length ((ww ww + 2)₁₆) |
| 00 01₁₆ | |
| 00 02₁₆ | parent_object_list_id |
| 00 03₁₆ | |
| 00 04₁₆ | parent_object_entry_id |
| 00 05₁₆ | |
| 00 06₁₆ | total_media_installed |
| 00 07₁₆ | |
| 00 08₁₆ | installed_media_descriptor[0] specification |
| ⋮ | ○  ○  ○ |
| ww ww₁₆ | installed_media_descriptor[n] specification |

Fig. 7

| address offset | contents | |
|---|---|---|
| $00_{16}$ | specification_length ( (xx + type_dependent_length + 1) $_{16}$) | |
| $01_{16}$ | attributes | |
| $02_{16}$ | media_type | |
| $03_{16}$ | length_tens_of_hours | length_hours |
| $04_{16}$ | length_tens_of_minutes | length_minutes |
| $05_{16}$ | reserved | |
| $06_{16}$ | title_length | |
| $07_{16}$ | title_text | |
| : | | |
| : | | |
| $xx_{16}$ | type_dependent_length | |
| : | type_dependent_information | |
| : | | |
| $xx_{16}$ + type_dependent_length | | |

Fig. 8

| address | contents |
|---|---|
| 00 00₁₆ | specification_length ((zz zz + manufacturer_dependent_length + 2)₁₆) |
| 00 01₁₆ | |
| 00 02₁₆ | unit_type (upper 5 bits) | unit (lower 3 bits) |
| 00 03₁₆ | most significant byte |
| 00 04₁₆ | company_id |
| 00 05₁₆ | least significant byte |
| 00 06₁₆ | number_of_object_lists (n) |
| 00 07₁₆ | |
| 00 08₁₆ | subunit_list_id_1 |
| 00 09₁₆ | |
| 00 0A₁₆ | model_name_length |
| 00 0B₁₆ | model_name |
| ⋮ | |
| 00 08 + model_name_length | |
| ww ww₁₆ | manufacturer_name_length |
| ⋮ | manufacturer_name |
| ⋮ | |
| ww ww₁₆ + manufacturer_name_length | |
| xx xx₁₆ | user_assigned_name_length |
| ⋮ | user_assigned_name |
| ⋮ | |
| xx xx₁₆ + user_assigned_name_length | |
| yy yy₁₆ | unit_type_dependent_info_length |
| ⋮ | |
| ⋮ | unit_type_dependent_information |
| ⋮ | |
| yy yy₁₆ + unit_type_dependent_info_length | |
| zz zz₁₆ | manufacturer_dependent_length |
| ⋮ | |
| ⋮ | manufacturer_dependent_information |
| ⋮ | |
| zz zz₁₆ + manufacturer_dependent_length | |

Fig. 9

| Subunit Identifier Descriptor ||
|---|---|
| address | contents |
| 00 00₁₆ | descriptor_length |
| 00 01₁₆ | |
| 00 02₁₆ | number_of_object_lists (n) |
| 00 03₁₆ | |
| 00 04₁₆ | object_list_id_1 |
| 00 05₁₆ | |
| : | : |
| : | object_list_id_n-1 |
| : | |
| : | subunit_dependent_length |
| : | |
| : | subunit_dependent_information |
| : | |
| : | manufacturer_dependent_length |
| : | |
| : | manufacturer_dependent_information |
| : | |

METHOD AND APPARATUS FOR REPRESENTING DEVICES AND AVAILABLE INFORMATION WITHIN A NETWORK OF DEVICES USING OBJECT LISTS AND OBJECT ENTRIES

FIELD OF THE INVENTION

The present invention relates to the field of providing information between devices in a standardized format. More particularly, the present invention relates to the field of providing information representing devices, their capabilities and information available from the devices in a standardized format.

BACKGROUND OF THE INVENTION

The IEEE 1394-1995 standard, "1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

There is currently a lack of available means and methods for uniformly representing the available devices within a network of devices, their capabilities and the available information and services which can be provided by those devices. Within a network, such as an IEEE 1394-1995 serial bus network, in which many different types of devices can be coupled together, it is desirable to be able to represent the capabilities of the devices and information available from the device in a uniform manner in order that this information can be provided to the other devices within the network. For example, for a tuner connected to a satellite receiving broadcast services which can vary over time, it is desirable to represent the currently available broadcast services in a list which can be provided to other devices. What is needed is a way to uniformly represent the devices, their capabilities and the information available from the devices which can be provided between the devices within the network.

SUMMARY OF THE INVENTION

Object lists and object entries provide a general hierarchical model for representing functions and capabilities of a network of devices in a uniform standardized format. The object lists and object entries are used to represent devices, subdevices, supported media, installed media and available services. Preferably, the devices are coupled together in an IEEE 1394-1995 serial bus network. The list of devices within the network are included within a unit object list, including unit object descriptors each representing a corresponding device. For devices having subunits, the unit object descriptor is associated with a subunit object list, including subunit object descriptors each representing a corresponding subunit within the device. Each subunit object descriptor then also has associated object lists, as appropriate, including a supported media object list including entries representing types of media supported by the subunit and an installed media object list including entries representing information available on the media currently installed within the subunit. For subunits capable of providing services, the subunit object descriptor has an associated object list, including an available services list including entries representing the services currently available through the subunit. The uniform standardized format of the object lists and object entries of the present invention allow two devices coupled together within the IEEE 1394-1995 serial bus network to exchange information including their respective object lists and entries.

DETAILED DESCRIPTION OF THE PREFERRED EMBODIMENT

Object lists and object entries of the present invention provide a general model for representing functions and capabilities of a network of devices in a uniform standardized format to demonstrate the hierarchical relationship between the represented devices and information available from those devices. The object lists and object entries are used to represent such things as devices, subdevices, supported media, installed media and available services. In the preferred embodiment of the present invention, the devices are coupled together in an IEEE 1394-1995 serial bus network. The list of devices within the network is included within a unit object list, including unit object descriptors each representing a corresponding device. For devices having subunits, the unit object descriptor is associated with a subunit object list, including subunit object descriptors each representing a corresponding subunit within the device. Each subunit object descriptor then also has associated object lists, as appropriate, including a supported media object list with entries representing types of media supported by the subunit and an installed media object list with entries representing the available information on the media currently installed within the subunit. The uniform standardized format of the object lists and object entries of the present invention allow two devices coupled together within the IEEE 1394-1995 serial bus network to exchange information including their respective object lists and entries.

Figure 1:
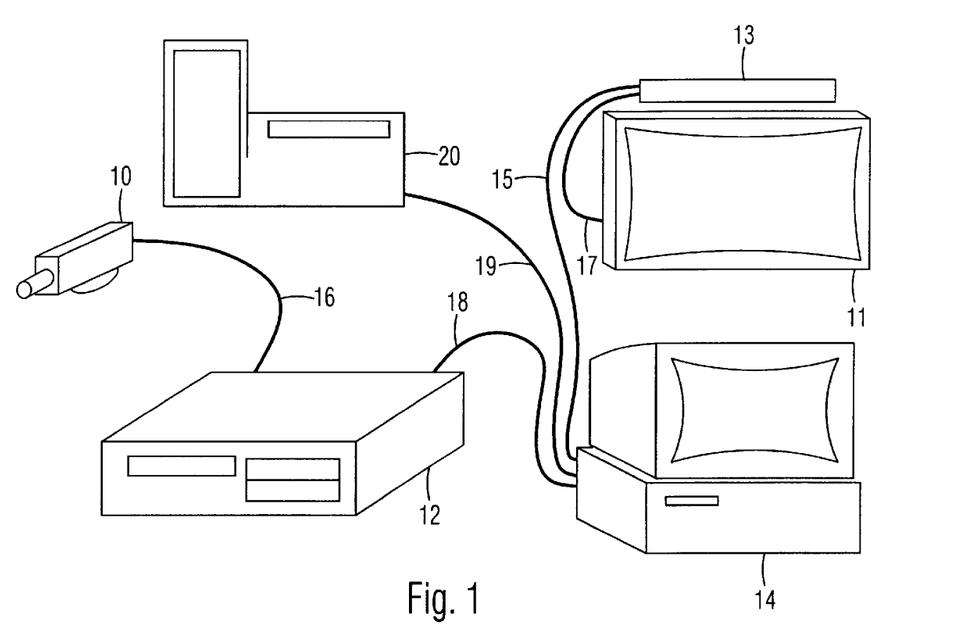
FIG. 1 illustrates a system including a video camera, a video cassette recorder, a computer, a settop box, a television and a compact disc changer coupled together within an IEEE 1394-1995 serial bus network.

FIG. 1 illustrates a system including a video camera 10, a video cassette recorder (VCR) 12, a computer 14, a settop box 13, a television 11 and a compact disc (CD) changer 20 connected together by IEEE 1394-1995 cables 15, 16, 18 and 19. The IEEE 1394-1995 cable 16 couples the video camera 10 to the VCR 12, allowing the video camera 10 to send data, commands and parameters to the VCR 12 for recording. The IEEE 1394-1995 cable 18 couples the VCR 12 to the computer 14, allowing the VCR 12 to send data, commands and parameters to the computer 14 for display. The IEEE 1394-1995 cable 15 couples the settop box 13 to the computer 14. The settop box 13 is also coupled to the television 11 by the cable 17. The CD changer 20 is coupled to the computer 14 by the IEEE 1394-1995 cable 19. This configuration illustrated in FIG. 1 is exemplary only, it should be apparent that an audio/video network could include many different combinations of components. The devices within such an IEEE 1394-1995 network are autonomous devices, meaning that in an IEEE 1394-1995 network, as the one illustrated in FIG. 1, in which a computer is one of the devices, there is not a true "master-slave" relationship between the computer and the other devices. In many IEEE 1394-1995 network configurations, a computer may not be present. Even in such configurations, the devices within the network are fully capable of interacting with each other on a peer basis. It should be recognized that data, commands and parameters can be sent between all of the devices within the IEEE 1394-1995 network, as appropriate.

Figure 11:
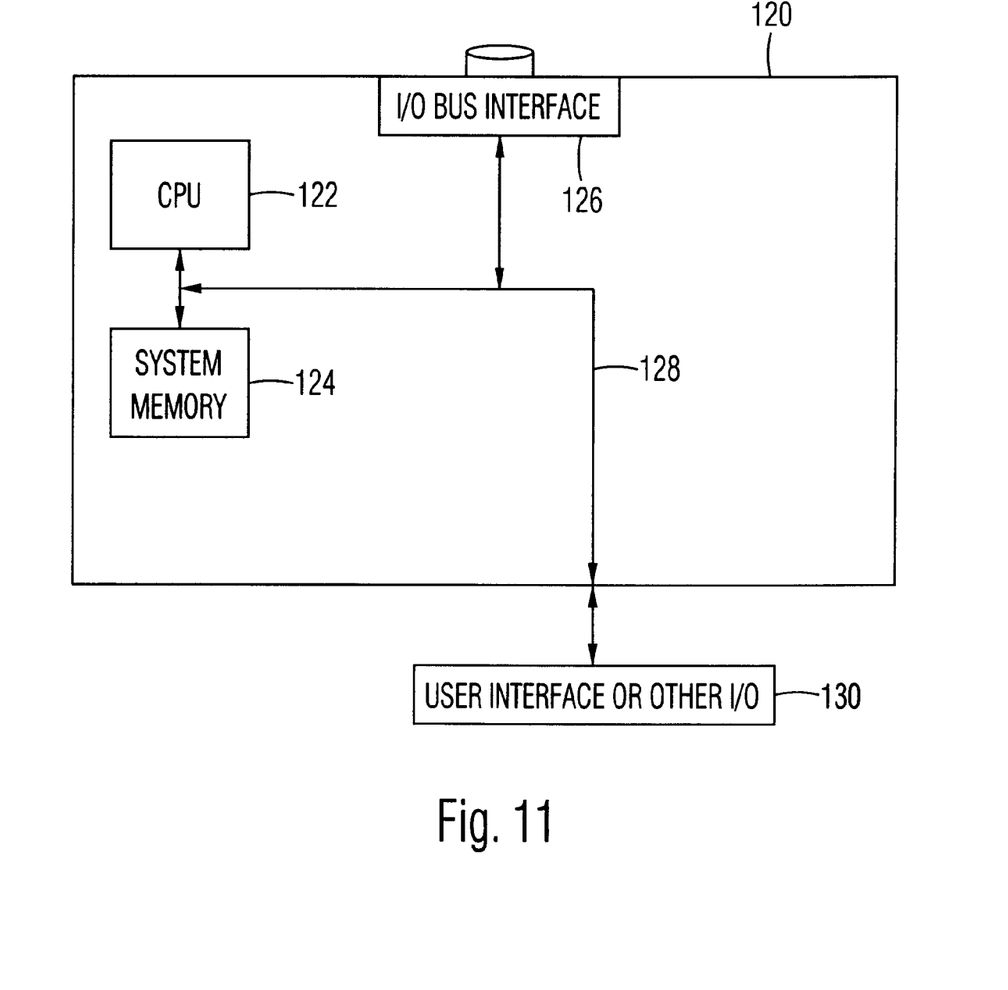
FIG. 11 illustrates a block diagram of a hardware system resident in each device implementing and maintaining the object lists and object entries of the present invention.

A block diagram of a hardware system resident in each device implementing and maintaining the object lists and object entries of the present invention is illustrated in FIG. 11. In the hardware system illustrated in FIG. 11, a printed circuit board 120 is coupled to a user interface 130. The printed circuit board 120 includes a central processing unit (CPU) 122 coupled to a system memory 124 and to an I/O bus interface 126 by the system bus 128. The user interface 130 is also coupled to the system bus 128. The user interface 130 is subsystem specific, but preferably includes at least a keyboard and display. Alternatively, the user interface 130 also includes other I/O devices for communicating with a user of the subsystem.

Objects and object lists of the present invention represent a generalized model for describing hierarchical relationships contained in units and subunits, as well as the hierarchical organization of media contents. A unit identifier descriptor describes the attributes of a component or device within the network. This unit identifier descriptor includes items such as the subunits within the unit as well as information regarding the manufacturer and model of the device. A subunit identifier descriptor describes the particular attributes of a subunit based on its type; e.g. VCR, tuner, display, storage. Both the unit and subunit identifier descriptors make use of the object and object list model of the present invention. The unit identifier descriptors are combined in a unit object list representing the devices within the network.

The object lists create a hierarchical model based on relationships between the included data. An object entry having associated object lists is a parent. An object list is a child. Each object list has object entries, some of which may have associated object lists. For example, an object entry representing the contents of a compact disc (CD), will have an associated object list including object entries representing each track on the CD.

Each entry in an object list has one or more defined fields used to indicate the number of object lists maintained by that entry, and the identification values for each object list. Object lists and entries within the lists are accessed via a set of AV/C commands, which are not directly tied to a particular storage model. In some situations, a subunit within a device will not actually maintain a complete object list in memory or in the standardized format of the preferred embodiment of the present invention. In such an alternate embodiment, portions of the list are fabricated only at the time that they are requested by outside controllers, allowing the actual storage format to be tailored to fit the constraints of the exact implementation. The controllers will access the descriptors, using descriptor commands. In response to a descriptor command, a subunit will provide the appropriate information in the format which will be described below.

The descriptor commands used to access descriptors are OPEN DESCRIPTOR, READ DESCRIPTOR, WRITE DESCRIPTOR, CREATE DESCRIPTOR and MOVE DESCRIPTOR. Access to all descriptors is achieved by specifying the unique ID value of the descriptor. This unique ID value is assigned by the owner of the descriptor which is the appropriate unit or subunit. The owners are required to maintain unique ID values as descriptors are added and deleted. Object lists are uniquely identified by an ID value and a type value. Within the hierarchy there may be many lists of the same type which are distinguished by their unique ID value.

Figure 2:
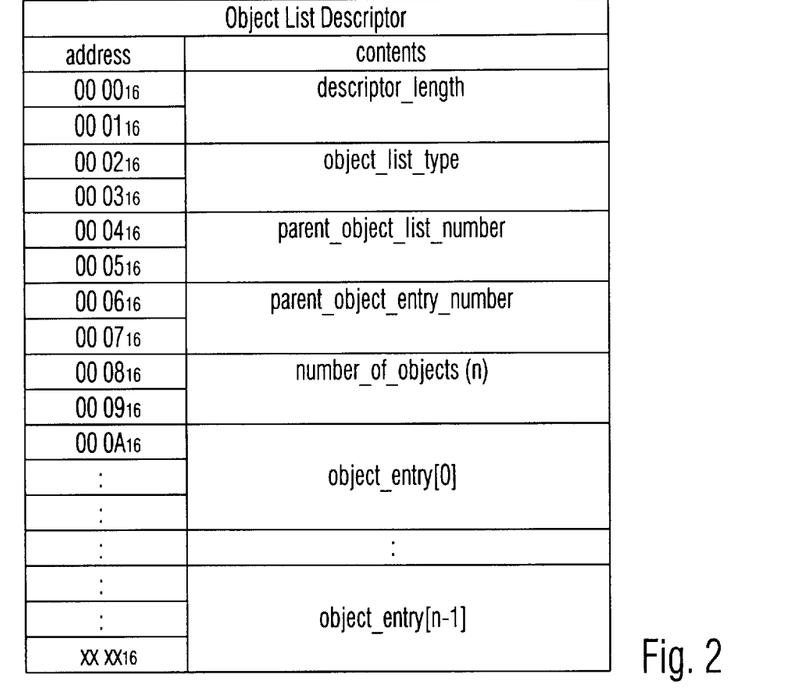
FIG. 2 illustrates an object list of the preferred embodiment.

An object list of the preferred embodiment is illustrated in FIG. 2. Within the preferred embodiment of the present invention, all object lists have the same basic layout, which includes a number of standard fields at the beginning followed by a collection of object entries. The descriptor_length field within the object list contains a value representing the number of bytes within the object list structure. The object_list_type field within the object list indicates what kind of list is contained within the object list and what kind of entries are contained in the object list. The kind of list indication allows a controller examining the list hierarchy to distinguish between the various pre-defined lists and any vendor-specific lists which may be attached, as will be described below.

The parent_object_list_number field within the object list holds the ID value of the parent list or the object list which points down to this object list. This field is useful for traversing up the list hierarchy for a certain descriptor, by asking the unit or subunit to access the descriptor specified by the parent_object_list_number. The parent_object_entry_number field within the object list holds the ID value of the object entry within the parent list which directly references the list. The number_of_objects field within the object list holds the number of entries in this object list.

In alternate embodiments of the present invention, the object list descriptor can be simplified, if appropriate. For example, if it is defined that object entries are allowed to have at most only one child list for a certain system, then the parent_object_list_number and the parent_object_entry_id values may be omitted.

Figure 3:
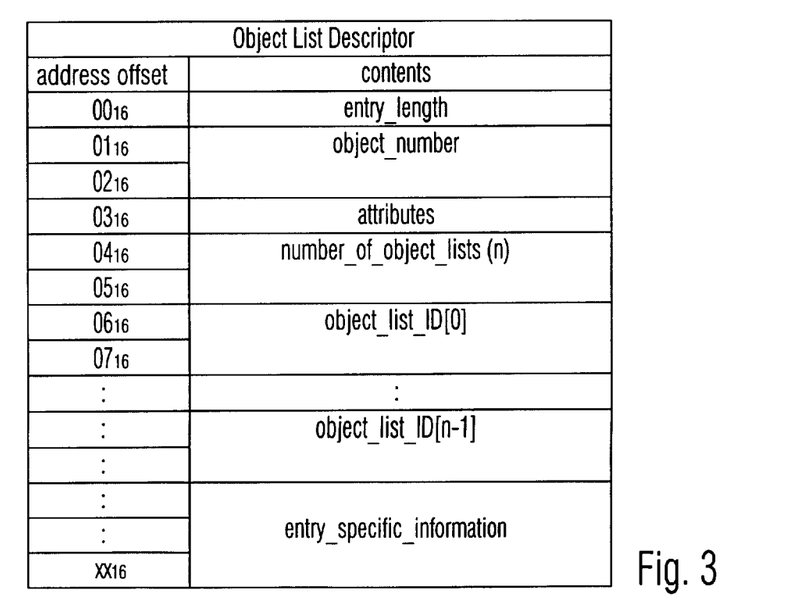
FIG. 3 illustrates an object entry descriptor of the preferred embodiment.

The object list also contains a number of object_entry fields for including the object entry information. An object entry descriptor of the preferred embodiment is illustrated in FIG. 3. The entry_length field within the object entry descriptor contains a value representing the number of bytes within this object entry. Preferably, the maximum size of an object entry is 255 bytes. Alternatively, the size of the object entry will vary based on the system which it represents. In this alternate embodiment, the size of the object entry could be larger than 255 bytes. If the object entry is empty, the entry_length field will have a value of 3, which includes the number of bytes occupied by the length and the object_number fields. The object_number field within the object entry descriptor indicates which position in the object list is occupied by this entry. The object_number field is maintained even for empty object entries. A unit or subunit is free to implement an appropriate list management strategy as necessary for a specific implementation. Preferably, object entries which are empty are included in the object list. Alternatively, empty object entries are deleted from the object list.

The attributes field within the object entry descriptor contains a set of bit flags which describe the object entry. Preferably, when the least significant bit is set to a logical high voltage level, the information within the object entry information fields currently do not contain valid or useful information and no object lists are associated with this object entry. The number_of_object_lists field within the object entry descriptor indicates how many object lists, if any, are directly associated with this object entry. If there are no object lists associated with the object entry, then the value within the number_of_object_lists field is set to zero. An object entry can have more than one object list associated with it. The value within the number_of_object_lists field indicates only the immediately associated lists, not any other lists which may exist further down in the hierarchy.

The object_list_ID fields within the object entry descriptor contain an ID value for each of the object lists associated with the object entry. If the value in the number_of_object_lists field is set to zero, then there will not be any object_list_ID fields in the object entry. The entry_specific_information field within the object entry descriptor preferably has a format and contents that are specific to the type of object being referenced. Included in the entry_specific_information field is an entry at the beggining indicating the size and number of bytes, followed by the information contained within the entry.

Figure 4:
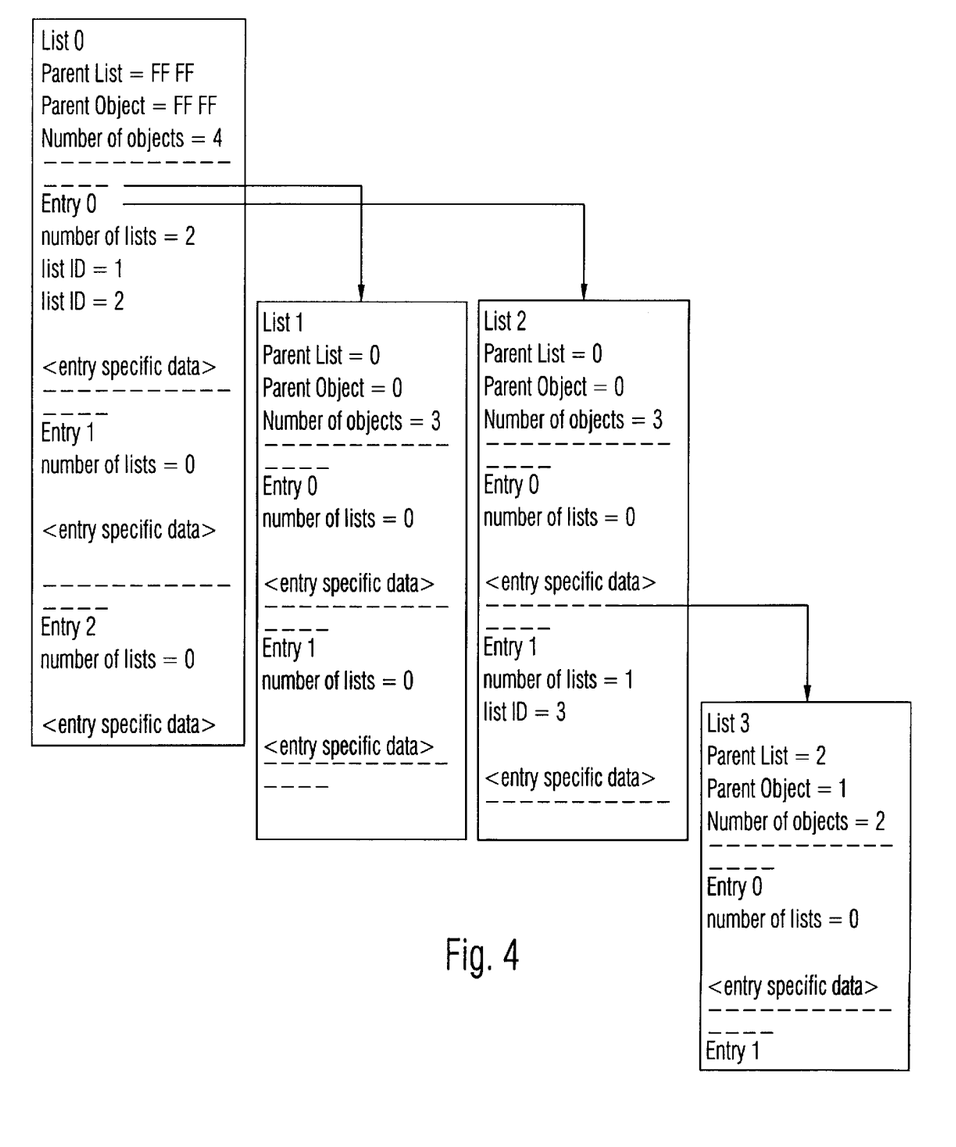
FIG. 4 illustrates a diagram of the general relationship between object lists and object entries of the present invention.

A diagram of the general relationship between object lists and object entries of the present invention is illustrated in FIG. 4. As shown within FIG. 4, each list includes identifying information and then a number of entries. The entry 0 of the list 0 has two object lists, the list 1 and the list 2, associated with it. Further down the hierarchy, the entry 1 of the list 2 has one object list, list 3, associated with it. In total, in the diagram of FIG. 4, there are three object lists that are associated with the list 0, but only two of the lists, list 1 and list 2, are directly associated with the entry 0 of the list 0.

As illustrated, each object entry includes a general header portion and a type-specific portion. The contents and format of the type-specific portion vary based on the kind of object that is being referenced. Units and subunits can have more than one associated object list. An individual object entry can also have more than one associated object list. There may also be different types of objects associated with a unit, subunit or object entry.

For subunits with removable media, one kind of object entry represents a single physical piece of media. The associated object list contains an entry for each media that is inserted into the subunit. For subunits which can accept a single piece of media, the object list will contain a single object entry. For subunits, such as changers, which can accept multiple pieces of media, the object list will contain as many entries as the number of pieces of media that the subunit can support at a single time. In the case of either a single media subunit or a media changer subunit, empty slots will require that an object entry exist in the list. These empty object entries will consist of only the length and object ID fields, as described above.

For subunits that handle live, non-recorded, data, such as tuners, one object entry represents one stream of data. For tuners, each of these object entries represent a broadcast service such as an available television channel or service. These services can be further decomposed into sub-streams, such as the english audio or closed-captioned text version of a particular service. In this case, each service has an associated object list that represents the component parts or elementary streams of the service. Each component that can be further divided into subcomponents will have an associated object list for those subcomponents. This general hierarchy model can be continued to any level of detail, as appropriate for a particular technology, device or implementation.

Manufacturers can further define their own private object types and lists corresponding to their respective device. In the preferred embodiment of the present invention, the vendor-specific object lists have a hexadecimal value in the object_list_type field of FF FD, as will be described below.

Figure 5:
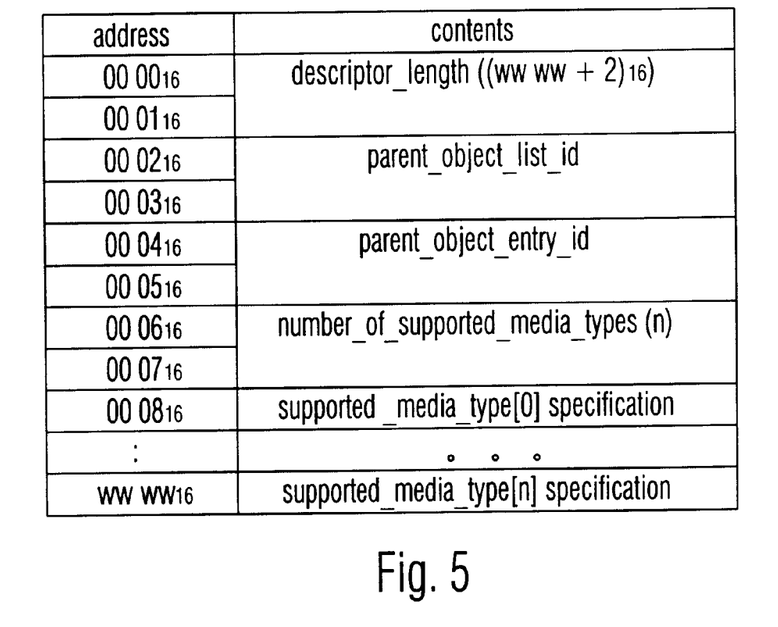
FIG. 5 illustrates a supported media object list.

Within the preferred embodiment of the present invention, a supported media object list describes a certain kind of media supported by a subunit. The supported media object list does not describe a piece of media that is installed in a subunit, but describes the type of media that can be installed in the subunit. A supported media object list is illustrated in FIG. 5. The descriptor_length, parent_object_list_id and parent_object_entry id fields are as described above. The number_of_supported_media_types field contains a value representing the number of different types of media supported by the particular subunit. For example, a digital video disk (DVD)/CD player supports two media types. The supported_media_type fields include information on the types of supported media. In the DVD/CD player example, there are two supported media type entries, one each for DVD and CD.

Figure 6:
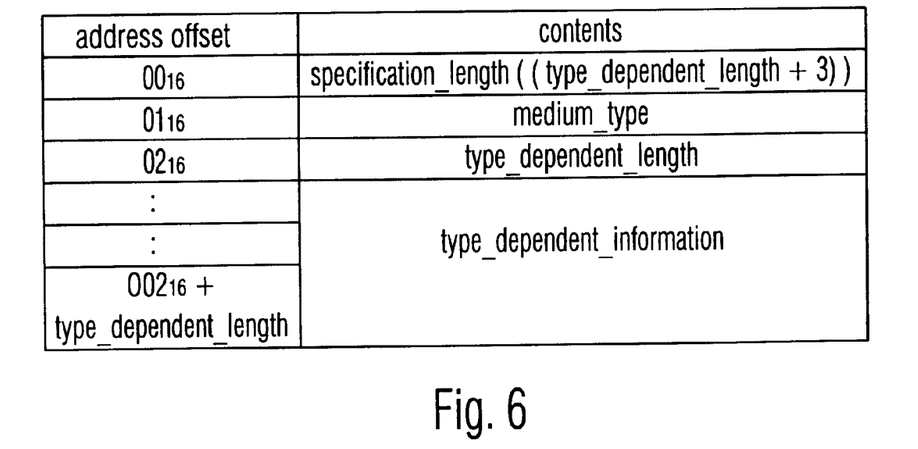
FIG. 6 illustrates an object descriptor representing the fields of information within each supported_media_type field.

An object descriptor representing the fields of information within each supported_media_type field is illustrated in FIG. 6. The specification_length field contains a value representing the total number of bytes within the entire media type descriptor. The medium_type field describes the type of medium that is being supported. The type_dependent_length field contains the number of bytes within the type_dependent_information field. The type_dependent_information field includes information that is specific to each type of medium supported by the subunit.

Figure 7:
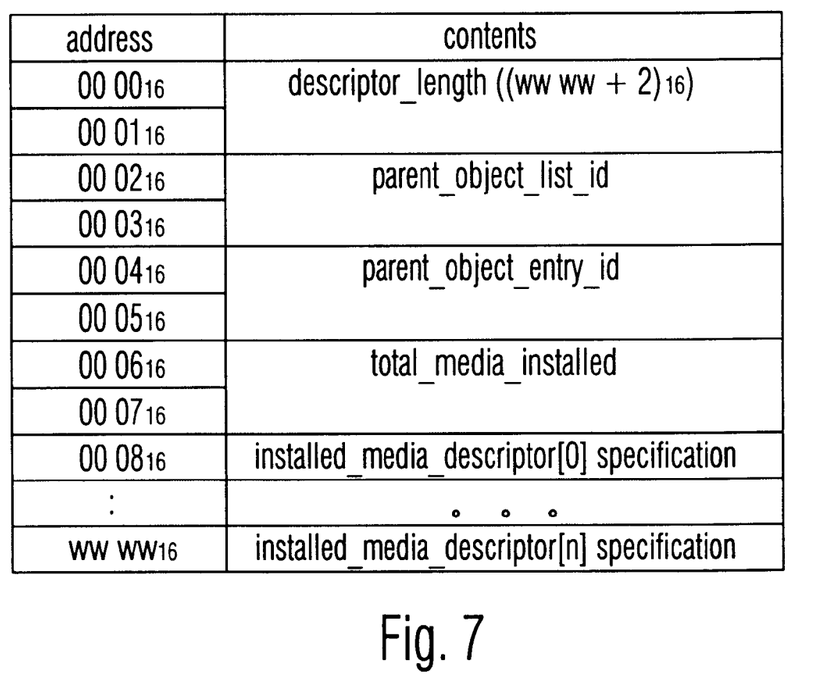
FIG. 7 illustrates an installed media object list.

Within the preferred embodiment of the present invention, an installed media object list includes the descriptors for the media which is actually installed in a subunit. An installed media object list is illustrated in FIG. 7. The descriptor_length field contains a value representing the number of bytes for the entire object list. The parent_object_list_id and parent_object_entry_id fields are as described above. The total_media_installed field includes a value representing the number of available slots within the subunit which are currently filled with media. If the value of installed media is unknown or unreliable, the value within the total_media_installed field is a hexadecimal value of FF FF. The installed_media_descriptor fields each include information for a corresponding one of the pieces of media installed in the subunit.

Figure 8:
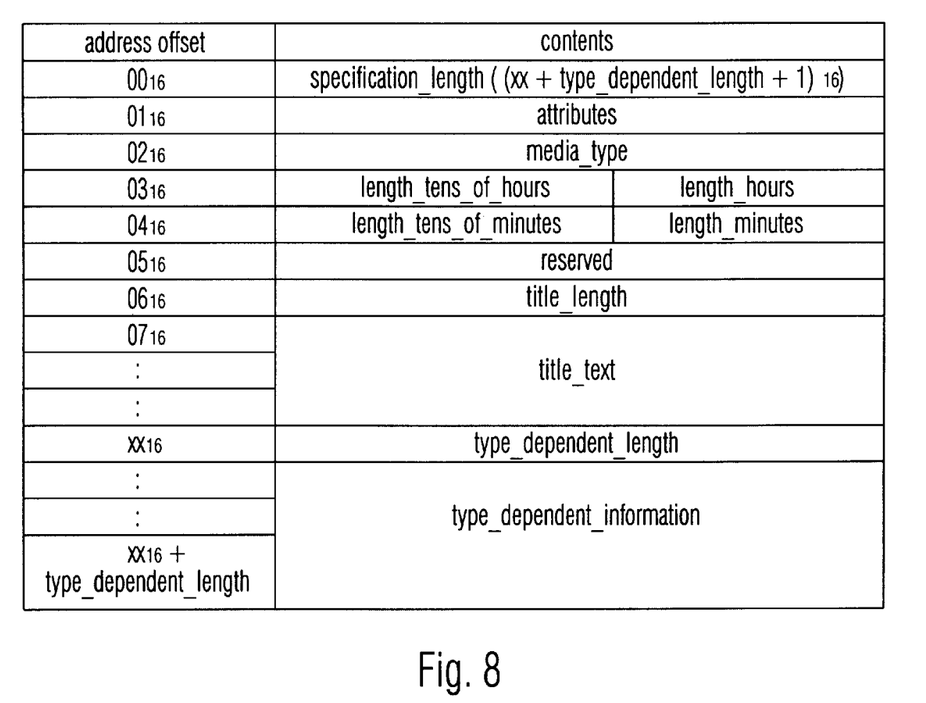
FIG. 8 illustrates an object descriptor representing the fields of information within each installed_media_ descriptor field.

An object descriptor representing the fields of information within each installed_media_descriptor field is illustrated in FIG. 8. Depending on the type of installed media, this object descriptor will have at least one associated object list containing information about the discrete pieces of information on the media. For example, a CD object descriptor will have a list of the tracks on the CD. Each entry will be a track descriptor.

The specification_length field within an installed media object descriptor contains a value representing the total number of bytes for the entire media object descriptor. The attributes field is a set of bit flags used to describe the status of the corresponding piece of media. Preferably, the least significant bit within the attributes field represents whether or not a piece of media is installed in this slot. If this flag is set to a logical high voltage level, the media is installed. Otherwise, if the flag is at a logical low voltage level, the slot is empty. The second least significant bit within the attributes field represents whether or not this particular piece of media is currently selected. If this flag is set to a logical high voltage level, the media is selected. Otherwise, if the flag is at a logical low voltage level, the media is not selected. The third least significant bit within the attributes field represents whether or not this particular piece of media is recordable and can be modified. If this flag is set to a logical high voltage level, the media is modifiable. Otherwise, if the flag is at a logical low voltage level, the media is not modifiable. The fourth least significant bit within the attributes field represents whether or not this particular piece of media is write protected. If this flag is set to a logical high voltage level, the media is normally modifiable, but has been write protected. Otherwise, if the flag is at a logical low voltage level, the media is not write protected. The remainder of the bits within the attributes field are reserved for future definition. It should be apparent to those skilled in the art that the set of bit flags could alternatively be configured in any other appropriate manner and state, in order to describe the status of the corresponding piece of media.

The length fields within the installed media object descriptor each represent values for the length of the medium in hours and minutes. This length does not represent recorded data, but is the total accessible length of the medium that is available for recording purposes. The reserved field is reserved for future specification. Preferably, the reserved field has a hexadecimal value of 00.

The title_length field within the installed media object descriptor includes a value representing the number of bytes included within the title_text field. The title_text field includes the title of the particular piece of media. The type_dependent_length field includes the number of bytes included within the type_dependent_information field. The type_dependent_information field contains information that is specific to the type of media represented by the object entry.

The object list model of the present invention is very useful for situations where the available information varies, either from time to time or from one implementation to another. Attributes such as the number of tracks on a CD or the number of segments on a tape will vary from one piece of media to the next. The number and type of available services over a broadcast service will also vary over time. Accordingly, the currently available information on these pieces of media or services can be easily included within an object list.

Preferably, for a given type of unit or subunit, there are a set of pre-defined object types and object lists. For example, a CD changer subunit, such as the CD changer 20, will preferably have an object list that contains entries for each of the installed CDs. The type attribute for that list indicates that it contains object descriptors for removable media. Membership by an object in this particular list indicates that it is an object descriptor of removable media. Further examination of the object entry reveals that it is a CD object descriptor. Because it is possible to create a changer subunit that handles different types of media, such as CDs and DVDs, it is possible to have object descriptors for different types of removable media in the same object list.

The preferred pre-defined values for the object_list_type field and the corresponding type of list represented, are illustrated in the following table:

TABLE I

PREFERRED PRE-DEFINED VALUES FOR THE OBJECT_LIST_TYPE FIELD

| TYPE OF LIST ENTRY | OBJECT_LIST_TYPE VALUE |
|---|---|
| removable media list | 00 01 |
| broadcast stream list | 00 02 |
| broadcast stream component list | 00 03 |
| tape segment list | 00 04 |
| tape area list | 00 05 |
| disc contents list | 00 06 |
| subunit list | 00 07 |
| preset list | 00 08 |
| play list | 00 09 |
| broadcast event list | 00 0A |
| control list | 00 0B |
| vendor-specific | FF FD |
| <invalid ID> | FF FE |
| <reserved> | FF FF |

A removable media list has an object_list_type hexadecimal value of 00 01 and contains object descriptors for removable media, such as CDs, DVDs, mini-discs and various kinds of tapes. A broadcast stream list has an object_list_type hexadecimal value of 00 02 and contains object descriptors for broadcast services, such as CNN® and Disney®. A broadcast stream component list has an object_list_type hexadecimal value of 00 03 and contains elementary streams or data streams of a broadcast service. A tape segment list has an object_list_type hexadecimal value of 00 04 and contains segment descriptors for a tape-based piece of media. A tape area list has an object_list_type hexadecimal value of 00 05 and contains area descriptors, explaining what kind of information is available on each area of a tape segment. A disc contents list has an object_list_type hexadecimal value of 00 06 and contains object descriptors representing the tracks or sections of a disc-based piece of media. A subunit list has an object_list_type hexadecimal value of 00 07 and contains object descriptors representing the subunits that make up a unit. A preset list has an object_list_type hexadecimal value of 00 08 and contains object descriptors representing preset values, such as preset stations on a radio tuner. A play list has an object_list_type hexadecimal value of 00 09 and contains object descriptors representing an order of play of tracks on media being played. A broadcast event list has an object_list_type hexadecimal value of 00 0A and contains object descriptors representing a list of programs available on a specified service or channel. A control list has an object_list_type hexadecimal value of 00 0B and contains object descriptors representing the user interface controls on the device. The subunit list is accessible from a unit. A vendor-specific list has an object_list_type hexadecimal value of FF FD, as described above.

Figure 9:
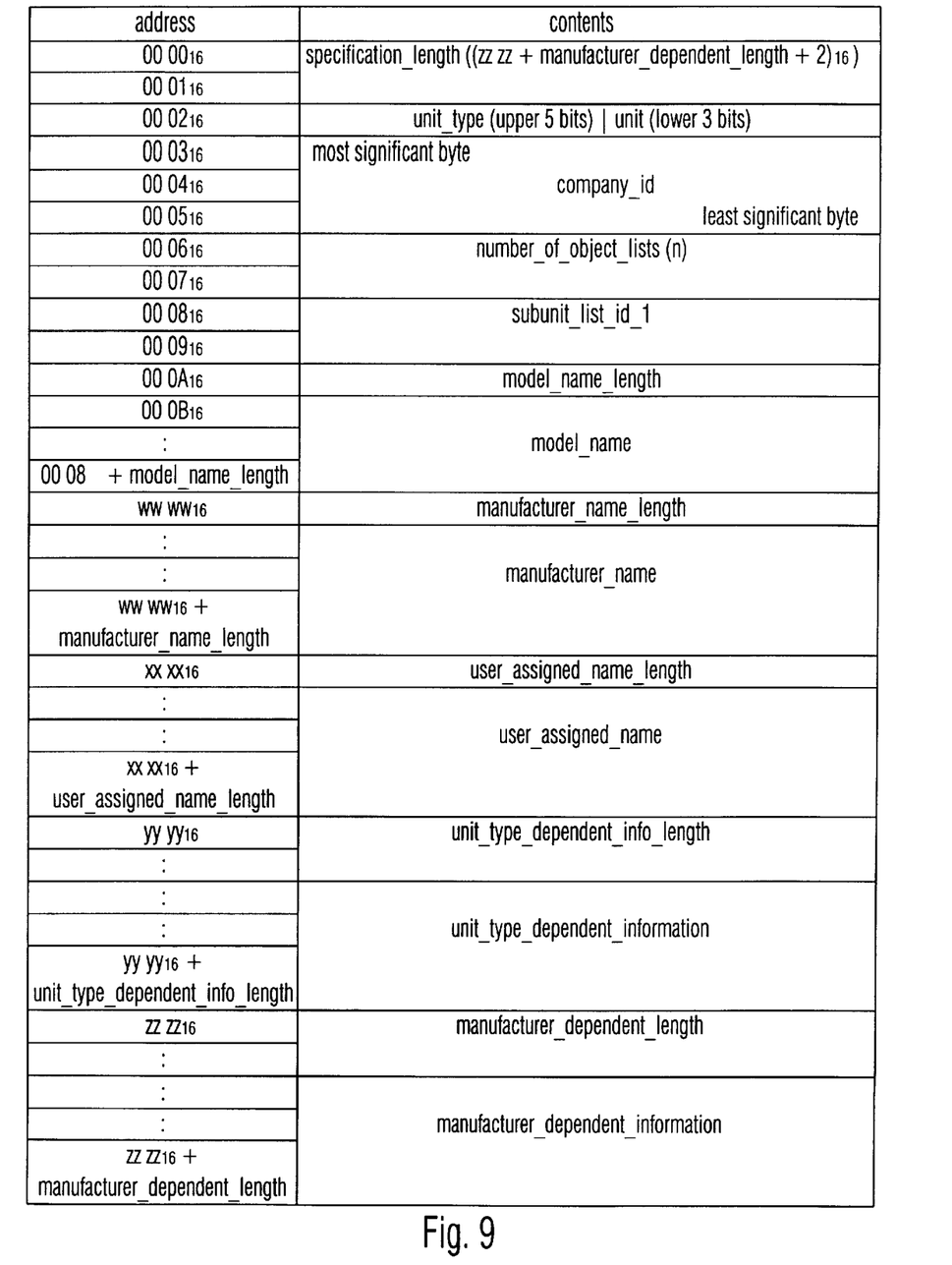
FIG. 9 illustrates a unit identifier object descriptor of the preferred embodiment.

A unit identifier object descriptor of the preferred embodiment of the present invention is illustrated in FIG. 9. The unit identifier object descriptor contains information describing the unit and its operation. The number_of_object_lists field in the unit identifier object descriptor contains a value representing the number of object lists that are directly attached to this descriptor. The subunit_list_id_1 field contains the ID of the object list which includes the subunit object entries for the subunits contained in this unit. The model_name_length and model_name fields specify the length and text of the model name assigned to the unit by the manufacturer. The manufacturer_name_length and manufacturer_name fields specify the length and text of the manufacturer of the unit. The user_assigned_name_length and user_assigned_name fields allow a user to specify a custom name which is unique to this instance of the unit. This is designed for those situations when many of the same type of devices are being used within the same network. By allowing a custom name, each device is assigned its own unique name. The unit_type_dependent_length and unit_type_dependent_information fields within the unit identifier object descriptor contain information whose format and contents are specific to a particular type of unit, as specified by the unit_type field. The manufacturer_dependent_length and manufacturer_dependent_information fields are for use by the manufacturer of the device.

Figure 10:
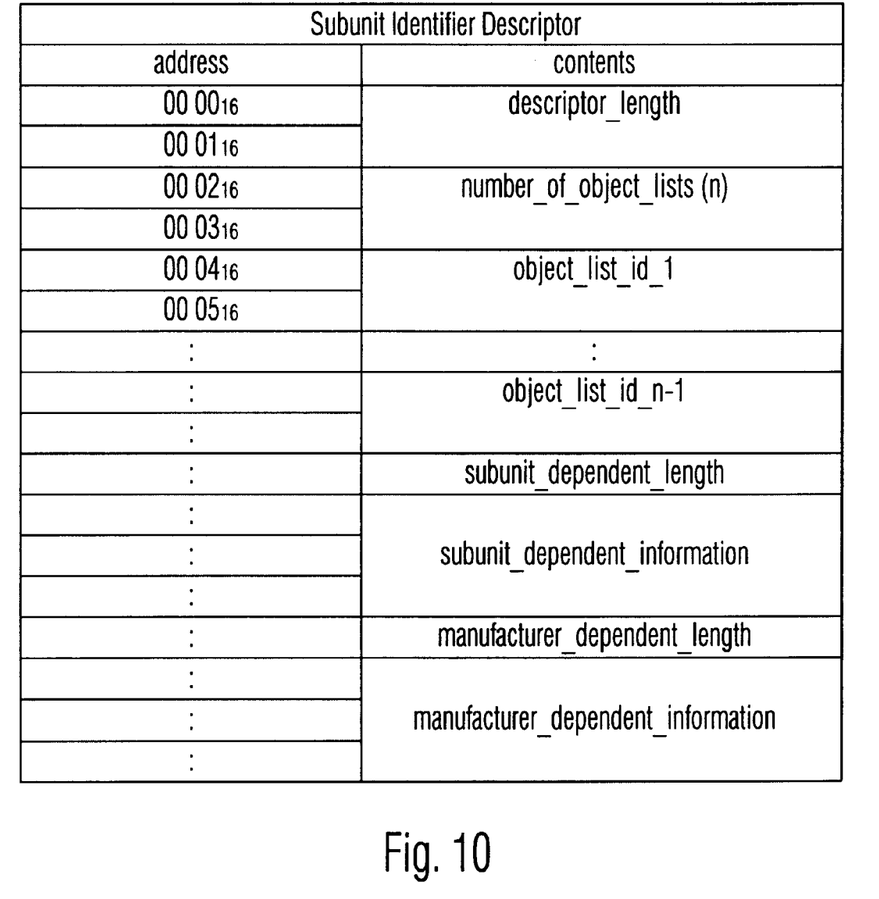
FIG. 10 illustrates a subunit identifier object descriptor of the preferred embodiment.

A subunit identifier object descriptor of the preferred embodiment of the present invention is illustrated in FIG. 10. The subunit identifier object descriptor contains attribute information describing the subunit and its operation. The descriptor_length field within the subunit identifier object descriptor contains a value representing the number of bytes used for this descriptor structure. The nunber_of_object_lists field contains a value representing the number of object lists directly associated with this subunit. Depending on the type of subunit, there can be at least two lists, such as for supported and installed media, as described above. It is also possible to have vendor-specific lists associated with the subunit. The object_list_id fields contain the ID values for each of the associated object lists. The subunit_dependent_length and subunit dependent_information fields contain subunit dependent information. The manufacturer_dependent_length and manufacturer_dependent_information fields are for use for vendor-specific data.

The object lists and object entries of the present invention provide a general model for representing functions and capabilities of a network of devices in a uniform standardized format to demonstrate the hierarchical relationship between the represented information. The object lists and object entries are used to represent such things as devices, subdevices, supported media, installed media and available services. While specific examples and preferred implementations of object lists and object entries have been described herein, it will be apparent to those skilled in the art that there are other acceptable formats and implementations for the object lists and object entries of the present invention than those described herein.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used to represent devices coupled together within an IEEE 1394-1995 serial bus structure, the present invention can also be implemented to manage devices within other bus structures.

We claim:

1. A method of representing functions and available information in a network of devices comprising:
   a. accumulating data in a memory at one or more devices within the network of devices about the functions of the network of devices and the available information; and
   b. maintaining the data in the memory in a hierarchical relationship, wherein the hierarchical relationship of the data includes object lists and one or more associated object entries representing a current state of the network of devices, each object entry representing a representative one of a device, a function and a piece of information.

2. The method as claimed in claim 1 wherein object entries within an object list refer to associated object lists.

3. The method as claimed in claim 2 wherein the object list includes a plurality of standard fields in a header and one or more object entries.

4. The method as claimed in claim 3 wherein the object list includes a reference to a parent list.

5. The method as claimed in claim 4 wherein the network of devices is an IEEE 1394-1995 serial bus network.

6. The method as claimed in claim 5 wherein the devices are audio/visual devices.

7. A method of representing functions and available information in a network of a plurality of devices comprising:
   a. accumulating data in a memory at one or more of the plurality of devices, wherein the data includes the functions of the network of devices and a representation of the available information;
   b. maintaining the data in the memory in a hierarchical relationship, wherein the hierarchical relationship of the data includes a plurality of object lists, each having one or more associated object entries grouped together to represent a current state of the network of devices, each object entry representing a representative one of a device, a subdevice, a function and a piece of information, wherein any of the devices with subdevices includes a subdevice object list with object entries representing the available subdevices within the device; and c. providing the data to a device within the network of devices when requested.

8. The method as claimed in claim 7 wherein the object lists include a plurality of standard fields within a header and one or more object entries.

9. The method as claimed in claim 8 wherein object entries within an object list refer to associated object lists.

10. The method as claimed in claim 9 wherein the object lists include a reference to a parent object list.

11. The method as claimed in claim 10 wherein the network of devices is an IEEE 1394-1995 serial bus network.

12. An apparatus for representing functions and available information within a network of devices comprising:

a. means for accumulating data about the functions of the network of devices and the available information; and b. a controlling circuit coupled to the means for accumulating for maintaining the data in a hierarchical relationship, wherein the hierarchical relationship of the data includes object lists and one or more associated object entries representing a current state of the network of devices, each object entry representing a representative one of a device, a function and a piece of information.

13. The apparatus as claimed in claim 12 wherein the object lists include a reference to a parent list.

14. The apparatus as claimed in claim 13 wherein the network of devices is an IEEE 1394-1995 serial bus network.

15. A network of devices coupled together for communication between the devices comprising:

a. a plurality of devices coupled together for communication; and b. a plurality of controlling circuits, each within a corresponding one of the plurality of devices, for accumulating data about the functions of the corresponding device and information available from the device, wherein the controlling circuits also maintain the data in a format including object lists and one or more associated object entries, each object entry representing a representative one of a subdevice, a function and a piece of information.

16. The network of devices as claimed in claim 15 further comprising a plurality of memory circuits, each coupled to a corresponding one of the plurality of controlling circuits.

17. The network of devices as claimed in claim 16 wherein the network of devices is an IEEE 1394-1995 serial bus network.

18. An apparatus for representing functions and available information within a network of devices comprising:

a. an accumulation circuit configured to accumulate data including the functions of the network of devices and a representation of the available information; and b. a controlling circuit coupled to the accumulation circuit to maintain the data in a hierarchical relationship, wherein the hierarchical relationship of the data includes object lists and one or more associated object entries representing a current state of the network of devices, each object entry representing a representative one of a device, a function and a piece of information.

19. The apparatus as claimed in claim 18 wherein the object lists include a reference to a parent list.

20. The apparatus as claimed in claim 18 wherein the network of devices is an IEEE 1394-1995 serial bus network.

* * * * *

UNITED STATES PATENT AND TRADEMARK OFFICE
CERTIFICATE OF CORRECTION

PATENT NO. : 6,260,063 B1
DATED : July 10, 2001
INVENTOR(S) : Ludtke et al.

It is certified that error appears in the above-identified patent and that said Letters Patent is hereby corrected as shown below:

Column 5,
Line 67, replace "beggining" with -- beginning --.

Column 6,
Line 59, replace "parent_object_entry id" with -- parent_object_entry_id --.

Column 9,
Lines 60-61, replace "number_of object_lists" with -- number_of_object_lists --.

Signed and Sealed this

Twenty-first Day of February, 2006

JON W. DUDAS
*Director of the United States Patent and Trademark Office*